(12) United States Patent
Owada et al.

(10) Patent No.: US 6,250,087 B1
(45) Date of Patent: Jun. 26, 2001

(54) SUPER-QUICK FREEZING METHOD AND APPARATUS THEREFOR

(75) Inventors: Norio Owada; Satoru Kurita, both of Abiko (JP)

(73) Assignee: ABI Limited, Chiba (JP)

( * ) Notice: Subject to any disclaimer, the term of this patent is extended or adjusted under 35 U.S.C. 154(b) by 0 days.

(21) Appl. No.: 09/410,813

(22) Filed: Oct. 1, 1999

(51) Int. Cl.[7] ............................. F25D 25/00; F25D 23/00; F25B 21/00; F24F 3/16
(52) U.S. Cl. ......................... 62/62; 62/3.1; 62/78; 62/264
(58) Field of Search ................... 62/78, 3.1, 62, 62/264

(56) References Cited

U.S. PATENT DOCUMENTS

| | | | | |
|---|---|---|---|---|
| 4,524,079 | * | 6/1985 | Hofmann | 426/234 |
| 5,230,220 | * | 7/1993 | Kang et al. | 62/78 |
| 5,293,753 | * | 3/1994 | Rothstein et al. | 62/78 |
| 5,527,105 | * | 6/1996 | Riach | 312/406 |
| 5,776,529 | * | 7/1998 | Qin et al. | 426/231 |
| 5,902,619 | * | 5/1999 | Rubow et al. | 426/235 |

FOREIGN PATENT DOCUMENTS

| | | |
|---|---|---|
| 3-241689 | 10/1991 | (JP) . |
| 06-323721 | 11/1994 | (JP) . |
| 07-265028 | 10/1995 | (JP) . |
| 9-131158 | 5/1997 | (JP) . |
| 9-138055 | 5/1997 | (JP) . |
| 9-310932 | 12/1997 | (JP) . |
| 10-179105 | 7/1998 | (JP) . |
| 10-253192 | 9/1998 | (JP) . |
| 10-300251 | 11/1998 | (JP) . |
| 91/01635 | 2/1991 | (WO) . |
| 91/07085 | 5/1991 | (WO) . |

* cited by examiner

*Primary Examiner*—William Doerrler
(74) *Attorney, Agent, or Firm*—Arter & Hadden LLP (57) ABSTRACT

A super-quick freezing method and apparatus for preserving the freshness of food ingredients and food products while enabling long-term storage is provided. Provided is a freezing store 11 capable of lowering the inner-temperature to −30° C. to −100° C.; and a fluctuating magnetic field generator 21 for applying a unidirectional magnetic field, which fluctuates within a 5% to 15% range about a arbitrary reference value fixed at a value between 1 to 20000 Gs in the positive and negative directions, to the central portion of the store. Also provided are ventilators 31 for circulating cold air within the store at a wind velocity of 1 to 5 m/sec; and a sound wave generator 41 for superimposing sound waves in the audio-frequency range with a sound pressure level of 2 to 10 dB onto the cold wind circulated by the ventilators 31. Also provided is an electric field generator 51 for applying an electric field with an intensity of 100 to 1000 kV/m to the central portion of the store. The fluctuating magnetic field generator 21 comprises permanent magnets 21a for applying a static magnetic field ranging between 1 to 20000 Gs to the central portion of the store, and electromagnetic coils 21b for applying a fluctuating magnetic field, which fluctuated within a 5% to 15% range about the static magnetic field, to the central portion of the store.

13 Claims, 2 Drawing Sheets

SUPER-QUICK FREEZING METHOD AND APPARATUS THEREFOR

BACKGROUND OF THE INVENTION

1. Field of the Invention

The present invention relates to a super-quick freezing method and apparatus capable of preserving the freshness of food ingredients and food products and enabling long-term storage thereof, and further capable preservation and storage of living cells.

2. Description of the Related Art

Various freezing methods and freezing apparatuses have been developed as a means of storing food ingredients and food products while preserving its freshness for a long period of time. However, when freezing perishable foods such as fishery products, it was not possible to fully prevent (1) emission of offensive odor after freezing and defrosting, (2) discoloration, (3) deterioration in taste, and (4) dripping (effusion of juice upon defrosting). (1) to (3) result from putrefaction of the food ingredients caused by bacteria which are increased in number and oxidization of the food ingredients. Dripping, as in (4), occurs because of the long period of time required for freezing. That is, ice crystals, which are formed by freezing free water existing in an object-to-be-frozen such as food ingredients and food products, become too large and bulky, and cause damage in cellular structure. (Free water is water which is not under constraint of proteins or such and which can move freely.) In other words, because it takes such a long time to go through a temperature range of 0° C. to −20° C., which is the temperature range in which solidification begins and terminates, the ice crystals become too large and bulky, causing the above dripping.

In order to prevent these problems, a freezing technique, as disclosed in Japanese Patent Laid-open Publication No. 10-179105, has been proposed recently.

In the above-proposed freezing technique, freezing is carried out by directly immersing an object-to-be-frozen into a liquid coolant, or by spraying a liquid coolant to the object, in order to accelerate the cooling rate. This restrains the ice crystals from growing during freezing, and prevents destruction of cellular structure. Further, by applying an electro-magnetic energy to the object-to-be-frozen, the size of water clusters is reduced. (These will be referred to hereinafter as "small clusters".) These small clusters can easily penetrate into the object-to-be-frozen. Because of the effect of restraining bacteria from increasing, which effect the small clusters possess, the number of live bacteria can be limited, resulting in improvement of quality.

However, in the above-proposed method, since methanol, ethanol, acetone or like materials are used as the liquid coolants, in many cases it is not possible to directly immerse the object-to-be-frozen thereinto. In order to avoid direct contact of the liquid coolant with the object-to-be-frozen, it is necessary to provide a pre-freezing process for packing the object into a container or like packages. When freezing by direct immersion, it will also be necessary to provide a post-treatment process of cleaning/removing the liquid coolant off from the surface of the object after defrosting. The above processes are inconvenient, and will take some amount of time, during which deterioration in freshness may occur.

Furthermore, in the above freezing method, the cooling and freezing is brought about by heat transmission caused by the contact with the liquid coolant, and thus, the cold is transmitted from the outer surface towards the inside. Therefore, freezing starts from the outer surface of the object-to-be-frozen, and proceeds gradually towards the inside. In other words, a frozen layer is formed firstly on the outer surface, and freezing progresses towards the inside. During this process, the cold goes through the initially-formed outer frozen layer, and is then transmitted towards the inside, so the transmission is greatly inhibited by the frozen layer. Thus, it takes a considerably long time for the freezing to complete, especially at the inner core, making it difficult to fully prevent destruction of cellular structure.

Further, when using freezing-storage in the field of bio-medical transplant, destruction of cellular structure and extension in operation time becomes fatal, and thus, the above proposed freezing method cannot be adopted.

SUMMARY OF THE INVENTION

The present invention solves the above mentioned problems, and its object is to provide a super-quick freezing method and apparatus that enables uniform, quick and instantaneous freezing of an object-to-be-frozen, wherein there exists no need for prior/posterior treatment processes and no difference in internal and external temperature within the object, enabling long-term storage while keeping the freshness of food ingredients and food products at high standards, and also enabling freezing-storage and preservation of living cells.

In order to accomplish the above object, the super-quick freezing method according to one aspect of the present invention comprises a quick-freezing step of cooling the surrounding temperature of an object-to-be-frozen to −30° C. to −100° C. while applying a unidirectional magnetic field to the object-to-be-frozen.

According to this method, a unidirectional magnetic field is applied to the object-to-be-frozen during the quick-freezing of the object. Thus, this magnetic field makes it possible to direct the magnetic moment, which is caused by the electron spin of the molecules constituting the object-to-be-frozen and of the free water molecules contained therein, in one direction. Thus the cold can be transmitted to the inner portion of the object-to-be-frozen quickly. That is, the difference in internal and external temperature within the object-to-be-frozen which occurs during cooling, i.e., the unevenness in cooling can be considerably diminished to realize quick cooling. Therefore, freezing occurs thoroughly in a uniform and simultaneous manner, and does not start from the outer surface. Also, since freezing does not start from the outer surface, an outer frozen layer rich would inhibit heat transmission is not formed, and thus, it is possible to realize an efficient transmission of cold to the inner portion of the object. This results in a considerable acceleration in the cooling rate of the inner portion of the object. Therefore, the time period in which freezing initiates and terminates can be reduced to an extremely short time throughout the whole object-to-be-frozen.

Since cooling is carried out while applying a magnetic field to the object-to-be-frozen, free water within the object-to-be-frozen can be brought into a supercooled state. A further cooling will cause the supercooled free water to start freezing, but since a heat quantity equivalent to the latent heat of solidification (forming ice) has already been taken away, the freezing will proceed quickly, and accordingly, the time period in which freezing initiates and terminates can be reduced to an extremely short time.

As a result, the above two effects make it possible to pass through the temperature range of 0 to −20° C., in which ice crystals are apt to grow during freezing, in an extremely short time. Therefore, the ice crystals of the free water are restrained from growing too large. Thus, it is possible to prevent destruction of cellular structure of the object-to-be-frozen during freezing, restrain dripping from occurring upon defrosting, and preserve the freshness at high standards.

The below will explain why a supercooled state is brought about by application of a magnetic field, and why the overall time in which freezing initiates and terminates can be reduced to an extremely short time.

The thermal activities of molecules of the object-to-be-frozen and of the free water molecules which exist within the object-to-be-frozen are weakened when cooled, and thus, the temperature of the object-to-be-frozen is dropped. (Since the main thermal activities are the stretching vibration and deformation vibration of bonds between the atoms constituting the molecules, and thermal vibrations caused by molecular thermal activities such as translational and rotational motions of molecules, the activities will hereinafter be defined as thermal vibrations.) As the temperature shifts into a low-temperature range below 0° C., the thermal vibrations become smaller. However, because of the precession of the electron spin, thermal vibration caused by the electron spin becomes dominant, and the thermal vibrations caused by molecular thermal activities are prevented from being reduced. Also, the orbital motions of the electrons that contribute to inter-atomic bonds are also precessed, and influence caused by such motion is also to be considered. Generally, these influences are mutually cancelled by the spin of the pairing electrons, and thus, such motion has little influence on thermal vibration. Therefore, since the vibration is kept small, the position of the free water molecules is fixed according to the hydrogen bond, and ice crystals are formed. In other words, freezing is initiated.

However, when a magnetic field is applied, since the magnetic moment of the electron spin is aligned in one direction, it is easy to unify the direction of the precessional axis of the electron spin. Thus, the influence of the electron spin on the thermal vibration cannot be mutually cancelled, and thermal vibration is strengthened and increased by the electron spin. Therefore, even when the temperature is dropped to an extent at which freezing is generally initiated, the vibration of the free water molecules are still too large to turn into ice, and instead the free water is brought into a supercooled state. That is, even though a heat quantity equivalent to the latent heat required for solidification has already been taken away, the free water cannot turn into ice and stays in a form of unstable water. When the temperature is further cooled to an extent in which the vibration becomes smaller than a certain level, or, when the magnetic field is relieved and the influence of the electron spin on the thermal vibration is mutually cancelled in order to suddenly lower the level of the vibration, which had been preventing freezing from occurring, below a certain level, the position of the molecules is fixed according to the hydrogen bond, and freezing progresses immediately. Therefore, the time period in which freezing initiates and terminates is reduced to an extremely short time.

It is considered that according to the above mechanism, it is possible to bring about a supercooled state by application of a magnetic field, and shorten the time period in which freezing initiates and terminates.

Further, in general, water clusters form hydrogen bonds with polar groups that face outwards from the outer surface of a tertiary structure which is the smallest unit of proteins constructing the object-to-be-frozen, and the water clusters are turned into bound water. (A tertiary structure is a substantially spherical structure formed by rolling up a primary structure, i.e., a condensation polymer formed by bonding various amino-acids linearly.) However, application of a magnetic field causes the water clusters, which are aggregations of free water molecules, to divide up into smaller groups. (These are hereinafter referred to as small clusters.) Thus, the small clusters attach compactly and evenly to the outer surface of the tertiary structures to form a quasi-monomolecular layer of bound water and cover the surface like an envelope. That is, the small clusters attach to the whole outer surface in an even, monomolecular-layer-like manner to form an envelope of bound water. Therefore, the envelope of bound water prevents the tertiary structures, i.e., the object-to-be-frozen from being oxidized, and the freshness can be preserved at high standards.

Since bound water is strongly attached to the tertiary structures, the freezing point of the bound water is depressed to be in the range of −10 to −100° C. Thus, generally, bound water is not subjected to freezing. By forming small clusters, free water is bound thoroughly to the outer surface of the tertiary structure, and thus, the free water is turned into bound water. Therefore, the absolute amount of free water is reduced, and it is possible to indirectly restrain free water crystals from growing too large.

Further, since the surrounding temperature is set in the range of −30 to −100° C., it is possible to advantageously restrain oxidization from occurring on the surface of the object-to-be-frozen while preventing excessive cooling. If the temperature is over −30° C., progress of oxidization cannot be prevented even if the object is in a frozen state; if it is cooled below −100° C., the running cost required for the refrigeration cycle will only increase since progress of oxidization will not be delayed any further, which would be uneconomical.

In the super-quick freezing method according to one aspect of the present invention, the intensity of the unidirectional magnetic field can be fluctuated about an arbitrary fixed-value reference in both the positive and negative directions within a predetermined range. According to this configuration, since the magnetic field is fluctuated during quick freezing of the object-to-be-frozen, it will be possible to reduce the counteraction against the action of the static magnetic field, i.e. reduce the counter effect to the static field, and enable the effects caused by application of the magnetic field to work efficiently.

Furthermore, because the magnetic field is fluctuated, the magnetic flux is changed and an electromagnetic induction occurs within the object-to-be-frozen. Thus, the induced electromotive force caused by the electromagnetic induction generates free electrons within the object. The object-to-be-frozen itself is reduced by these free electrons and is prevented from oxidization. As for the water within the object-to-be-frozen, the free electrons are given to the water, and electron-imparted water is produced. The electron-imparted water produces radicals such as hydroxy-radicals (active oxygen species), and the cell membrane of microbes such as bacteria can be destroyed by these hydroxy-radicals. Therefore, it is possible to limit the number of live bacteria.

Further, in the super-quick freezing method according to one aspect of the present invention, cooling of the object-to-be-frozen can be caused by a cold wind having a velocity of 1 m/sec to 5 m/sec, and a sound wave within the audio-frequency range can be superimposed onto the cold wind. According to this configuration, since sound waves are superimposed onto the cold wind which contacts the object-to-be-frozen, the slight change in air pressure caused by the sound waves can effectively stir up a boundary-layer of air which is formed about the surface of the object-to-be-frozen or the surface of a pan onto which the object-to-be-frozen is placed, and which inhibits heat transmission. Therefore, heat transmission is improved and the cooling rate of the object-to-be-frozen caused by the cold air is accelerated, thereby enabling the temperature to drop quickly. As a result, the temperature range of 0 to −20° C., in which ice crystals of free water become bulky, is passed in a short time. Therefore, the ice crystals can be restrained from growing too large.

Further, due to the use of sound waves in the audio-frequency range, it is possible to prevent oxidization of the surface of the object-to-be-frozen without causing destruction of the envelope of bound water formed on the surface of the object-to-be-frozen. In other words, it is possible to prevent the envelope of bound water on the surface of the object-to-be-frozen from tearing off, which would occur if the frequency is too high, such as in the ultrasonic range.

Further, since the wind velocity of the cold air is in the range of 1 to 5 m/sec, heat transmission will be achieved by convection. Thus it will be possible to accelerate the cooling rate, restrain the envelope of bound water on the surface of the object-to-be-frozen from evaporating, and prevent oxidization from occurring on the surface of the object-to-be-frozen. That is, if the wind velocity is too slow, heat transmission between the cold air and the object-to-be-frozen will be too small, making it impossible to drop the temperature quickly enough for freezing; but since the wind velocity is 1 m/sec or greater, such problem can be avoided to the utmost. On the other hand, if the wind velocity is over 5 m/sec, the envelope of water will evaporate and the surface of the object-to-be-frozen will be exposed, causing oxidization of the surface; but since the velocity is 5 m/sec or less, this problem can also be avoided.

Furthermore, in the super-quick freezing method according to one aspect of the present invention, an electric field can be applied to the object-to-be-frozen. According to this configuration, the electric field will cause electrons to be given to the water molecules contained in the object-to-be-frozen, and electron-imparted water will be produced. The electron-imparted water produces radicals such as hydroxy-radicals, and the cell membrane of microbes such as bacteria is destroyed by these hydroxy-radicals. Thus, by applying an electric field during freezing, it is possible to extremely reduce the number of live bacteria, and restrain putrefaction of the objects-to-be-frozen.

A super-quick freezing apparatus according to another aspect of the present invention comprises a freezing store capable of cooling the inner-temperature surrounding the object-to-be-frozen to −30° C. to −100° C.; and a magnetic field generating means for applying a unidirectional magnetic field to the object-to-be-frozen placed in the freezing store.

The magnetic field generating means can be a fluctuating magnetic field generating means which is capable of applying a fluctuating magnetic field wherein the intensity of the unidirectional magnetic field fluctuates about a reference (which is an arbitrary fixed value) in both the positive and negative directions within a predetermined range. The fluctuating magnetic field generating means can be comprised of a static magnetic field generating means capable of applying a static magnetic field having an intensity of the arbitrary fixed value; and a dynamic magnetic field generating means capable of applying a magnetic field that fluctuates within the predetermined range. According to this configuration, since the fluctuating magnetic field generating means is composed of separate static magnetic field generating means and dynamic magnetic field generating means, the type of magnetic field generating means can be selected more freely.

The super-quick freezing apparatus according to the above aspect can be provided of a ventilating means capable of ventilating cold air within the freezing store towards the object-to-be-frozen at a wind velocity of 1 to 5 m/sec, and a sound wave generating means capable of superimposing a sound wave within the audio-frequency range onto the cold wind ventilated by the ventilating means. Further, the super-quick freezing apparatus may comprise an electric field generating means capable of applying an electric field to the object-to-be-frozen. The electric field generating means may comprise at least one pair of electrodes that are arranged so as to oppose each other across the object-to-be-frozen placed within the freezing store, and a potential generator capable of applying a potential between the electrodes.

The freezing store may have freezing chamber walls which define a chamber space, a far-infrared-ray absorbing means which is arranged on the inner wall surface of the freezing chamber walls, and heat insulators which surround the freezing chamber walls. According to this configuration, the far-infrared-ray absorbing means will absorb the radiant heat of the object-to-be-frozen, and thus, the cooling rate can be accelerated. Also, the heat insulators contribute to maintaining the chamber temperature, and thus, the cooling efficiency is improved. Further, as for the static magnetic field generating means, it is possible to use permanent magnets which are provided on the outer wall surfaces of the freezing chamber walls and which generate a static magnetic field within the chamber. As for the dynamic magnetic field generating means, it is possible to provide electromagnetic coils which are arranged outside of and lateral to the freezing chamber walls, and which generate a magnetic field, that fluctuates back and forth against the static magnetic field, within the chamber. According to this configuration, since permanent magnets are used as the static magnetic field generating means, it is possible to reduce the capacity of the electromagnetic coil that generates the fluctuating magnetic field, lower the overall cost of the super quick freezing apparatus, and also reduce power consumption. Also, by providing the electromagnetic coils outside the freezing chamber walls, it is possible to prevent inhibition of cooling within the chamber, which would otherwise be caused by the heating of the electromagnetic coils.

BRIEF DESCRIPTION OF DRAWINGS

FIG. 1 is a diagram showing one embodiment of a super-quick freezing apparatus according to the present invention wherein

DETAILED DESCRIPTION OF PREFERRED EMBODIMENTS

Figure 1A:
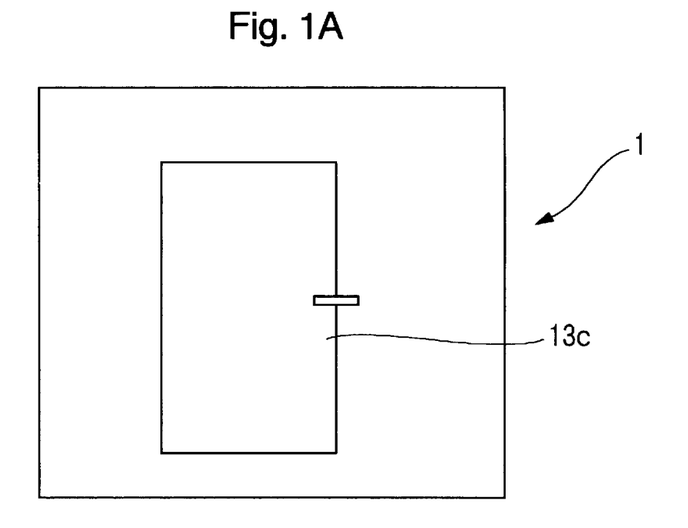
FIG. 1A is a front view thereof.
Figure 1B:
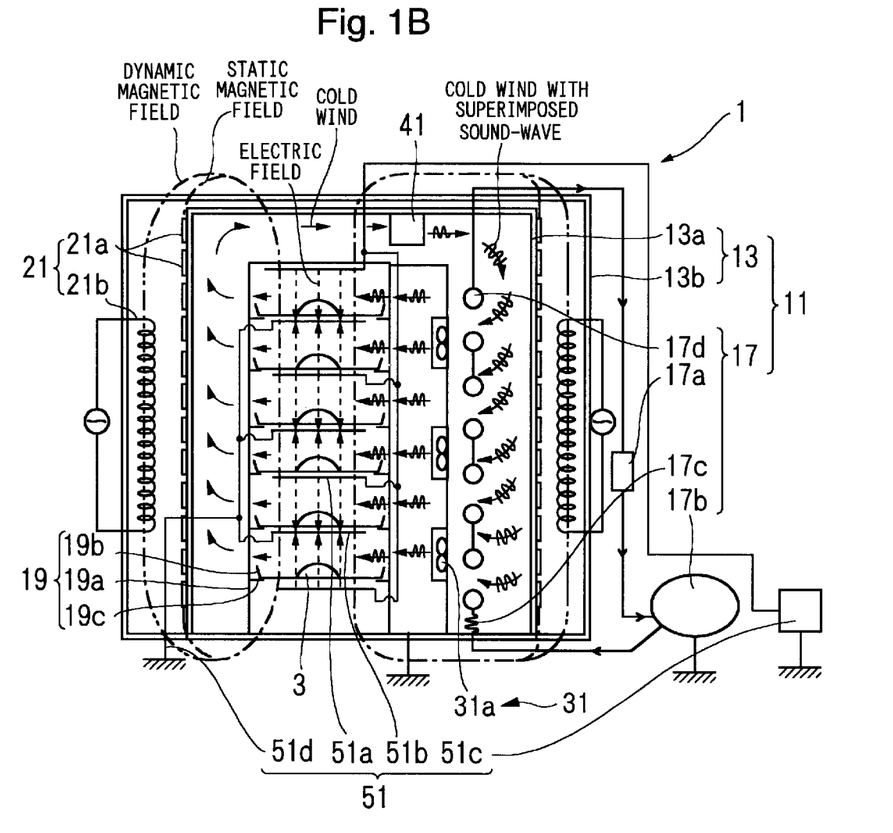
FIG. 1B is a schematic view showing a central section of a freezing store.
Figure 2:
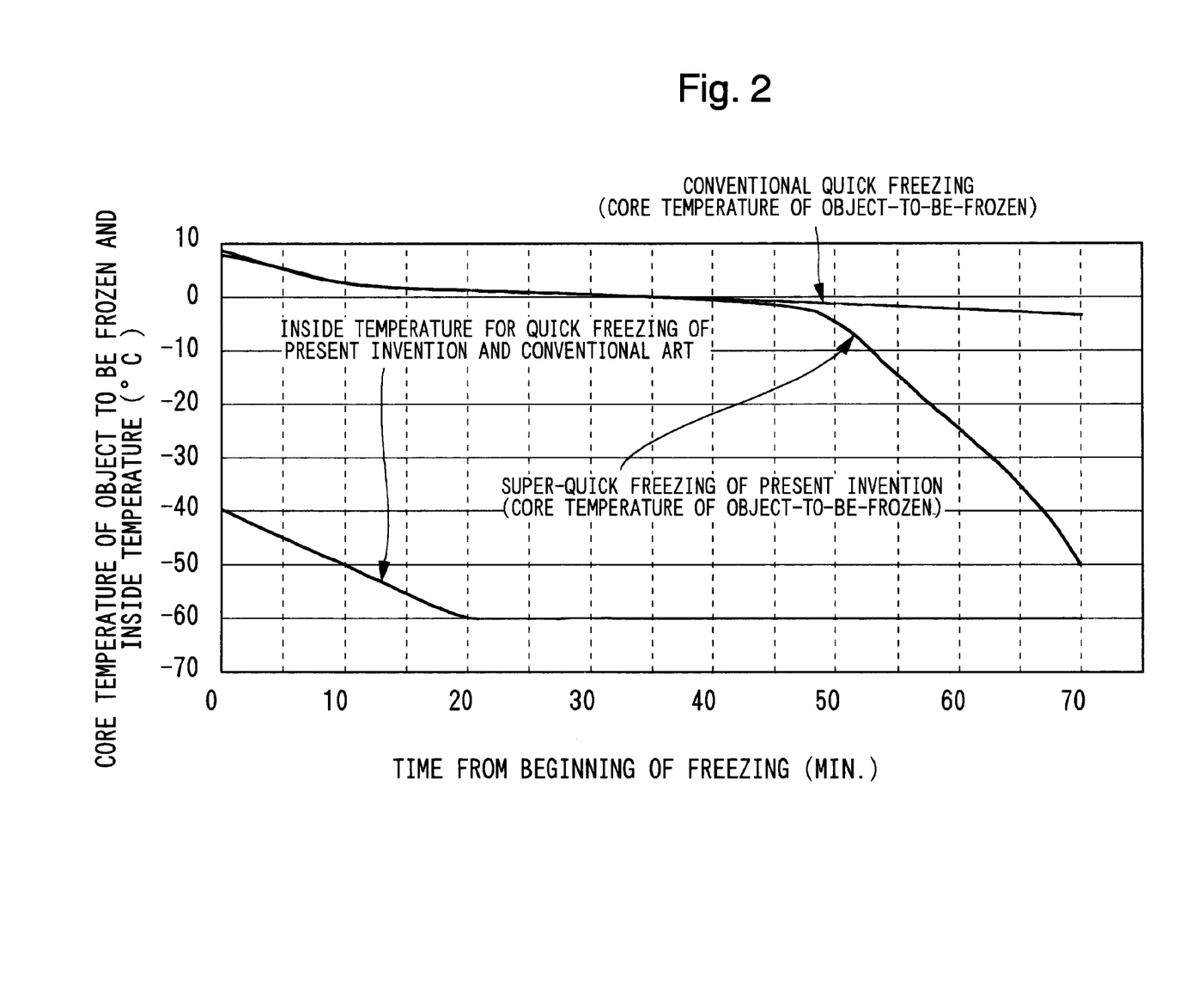
FIG. 2 is a graphical representation comparing the cooling rate of a super-quick freezing apparatus according to the present invention and a conventional quick freezing apparatus.

A preferred embodiment of the present invention will be described in detail below with reference to the accompanying drawings. FIG. 1 is a diagram showing one embodiment of a super-quick freezing apparatus according to the present invention, wherein FIG. 1A is a front view thereof, and FIG. 1B is a central section of a freezing store. FIG. 2 is a graphical representation comparing the cooling rate of a super-quick freezing apparatus according to the present invention and a conventional quick freezing apparatus.

As can be seen from FIG. 1A and FIG. 1B, the super-quick freezing apparatus 1 of the present embodiment comprises a freezing store 11 capable of realizing an inside-temperature of −30° C. to −100° C.; a fluctuating magnetic field generator 21, as a fluctuating magnetic field generating means, which applies a fluctuating magnetic field to the central portion of a chamber of the freezing store 11, wherein the fluctuating magnetic field fluctuates 5 Gs in both the positive and negative direction about a reference value of 100 Gs taken as an arbitrary fixed value; ventilators 31, as a ventilating means, which circulate cold air in the freezing store 11 at a wind velocity of 1 to 5 m/sec; a sound wave generator 41, as a sound wave generating means, which superimposes a sound wave onto the cold air being circulated by the ventilator 31, the sound wave having a sound pressure level of 2 to 10 dB and being in the audio-frequency range; and an electric field generator 51, as an electric field generating means, which applies an electric field ranging between 100 to 1000 kV/m to the central portion of the chamber of the freezing store 11.

The freezing store 11 is comprised of a sealingly closed body 13 being substantially rectangular solid in shape and having an open/close door 13c, and a freezer 17 for cooling of the body 13.

The freezer 17 adopts a general refrigeration cycle in which a compressor 17a, a condenser 17b, a capillary tube (expansion valve) 17c, and evaporators (vaporizer) 17d are circularly connected together, a refrigerant being circulated therethrough. The evaporators 17d, which generate cold air, and the capillary tube 17c are placed inside a chamber of the body, while the compressor 17a and the condenser 17b are placed outside the chamber.

The body 13 has a double-wall structure comprising freezing-chamber walls 13a which define the inner-chamber space with a dimension of 1.0 m (length)×1.5 m (height)×0.8 m (width), and outer walls 13b which surround the chamber walls at a distance to define an outer portion. Beat insulators (not shown) are arranged between the outer walls 13b and the freezing-chamber walls 13a, and a far-infrared-ray absorbing material (not shown) is coated on the whole inner surface of the freezing-chamber walls in order to enhance the cooling efficiency inside the chamber. In the present embodiment, aluminum plates are used as the freezing-chamber walls 13a, and the whole inner surface thereof is coated with a ceramic having a far-infrared-ray absorptance of 95%. However, it is possible to attach far-infrared-ray absorbing plates on the inner surface of the walls.

Located substantially in the center of the chamber is a rack 19 onto which the object-to-be-frozen, such as food ingredients/food products, are placed. The rack 19 is comprised of a grating-like framing 19a wherein substantially U-shaped portal frames placed opposingly in front and rear positions are connected together by rod-like members such as angle irons; and pans 19b which are supported by engaging members 19c fixed onto the framing 19a at appropriate intervals in the height direction. The objects-to-be-frozen 3 are to be placed on these pans 19b. The pans 19b are removably engaged onto the engaging members 19c to form a plurality of removable/attachable shelves in the framing 19a.

In the figure, the above-described evaporators 17d are arranged on the right hand side of the rack 19. The evaporator 17d is formed by folding a copper pipe several times, and the chamber is cooled by the latent heat of evaporation of the refrigerant which circulates therethrough. That is, the evaporators 17d generate the cold air inside the chamber, and are cyclically connected to the above-mentioned compressor 17a and the condenser 17b, which are placed outside the chamber, and the capillary tube 17c by pipings in order to construct the refrigeration cycle capable of realizing the inner-chamber temperature of −30° C. to −100° C.

The ventilators 31, as a ventilating means, are arranged between the evaporators 17d and the rack 19 in order to circulate the cold air inside the chamber. The ventilators 31 ventilate the cold air cooled by the evaporators 17d horizontally towards the objects-to-be-frozen 3 placed on the rack 19, by mean s of fins 31a which are rotated by motors or the like. In order to ventilate the cold wind towards the objects-to-be-frozen 3 at a uniform velocity, a plurality of ventilators 31 are arranged at appropriate intervals in both the height and length directions. It is possible to adjust the wind velocity so that the velocity at the site of the objects-to-be-frozen 3 is in the range of 1 to 5 m/sec. This wind velocity is determined mainly according to the type of object-to-be-frozen.

Because the wind velocity of the cold air is in the range of 1 to 5 m/sec, heat transmission will be made by convection. Thus, it will be possible to accelerate the cooling rate, restrain the envelope of bound water on the surface of the object-to-be-frozen from evaporating, and prevent occurrence of oxidization on the surface of the object-to-be-frozen. That is, if the wind velocity is too slow, convection heat transmission will not be effective, and heat transmission between the cold air and the object-to-be-frozen will be too small, making it impossible to realize quick freezing; but since the wind velocity is 1 m/sec or greater, such problems can be avoided to the utmost. On the other hand, if the wind velocity is over 5 m/sec, the envelope of bound water will evaporate and the surface of the object-to-be-frozen will be exposed, causing oxidization of the surface; but since the velocity is 5 m/sec or less, this problem can also be avoided.

The cold air itself is heated while it cools the object-to-be-frozen 3. Thus, a circulation path is formed so that after contact with the object-to-be-frozen 3, the air ascends along the surface of the freezing-chamber wall on the other side, is transferred along the surface of the ceiling and along the surface of the freezing-chamber wall behind the freezers 17, and is returned to the evaporators 17d.

The sound wave generator 41 is arranged beneath the surface of the ceiling which is a part of the above circulation path. This sound wave generator 41 generates sound waves which are adjusted within the audio-frequency range. The sound waves are superimposed onto the circulated cold air and is brought into contact with the object-to-be-frozen 3. The sound waves cause a slight change in air pressure to thereby stir up a boundary-layer of air which is formed about the surface of the object-to-be-frozen 3 or on the surface of the pan 19b onto which the object-to-be-frozen 3 is placed, and which inhibits heat transmission. Therefore, heat transmission is improved.

Due to the use of sound waves in the audio-frequency range, it is possible to prevent the occurrence of oxidization on the surface of the object-to-be-frozen 3 without causing destruction of the envelope of bound water formed on the surface of the object-to-be-frozen 3. That is, it is possible to prevent the envelope of bound water on the surface of the object-to-be-frozen 3 from tearing off, which would occur if the frequency is too high, such as in the ultrasonic range.

Further, it is preferable to use a sound pressure level ranging between 2 to 10 dB. Keeping the level in this range will enable prevention of tearing of the envelope of bound water, prevention of noise emission, and efficient stirring of the boundary-layer of air.

The electric field generator 51 comprises electrode plates which are arranged above each pan 19b of the rack 19; an electrode plate arranged beneath the undermost pan 19b; a high-voltage alternating current potential generator 51c which is connected to every other electrode plate to apply an alternating high-voltage potential, that is, a high-voltage alternating current potential; and a grounding 51d connected to the electrode pans that are not connected to the high-voltage alternating current potential generator 51c. The electrodes are mainly grouped into first electrode plates 51a to which a high-voltage alternating current potential is applied by the high-voltage alternating current potential generator 51c, and second electrode plates 51b which are grounded to the earth through the grounding 51d, both being arranged alternately in the vertical direction. When a high-voltage alternating current potential is applied to the first electrode plates, an electric field is generated in the spaces existing between each first electrode plate and the second electrode plates opposing each first electrode plate from its upper and lower sides, wherein the direction of the electric field is inverted periodically. The electric field is applied in the vertical direction against the objects-to-be-frozen 3 placed on the pans 19b located in each of these spaces. Here, since the first and second electrode plates are arranged alternately, the direction of the electric field applied to the objects-to-be-frozen 3 is directed in the inverting direction for each vertically-adjacent shelves, as is indicated by broken lines in FIG. 1B. (Since a high-voltage alternating current potential is applied to the first electrode plates, the direction of the electric field indicated by broken lines is inverted periodically.) The first electrode plates 51a are fixed to the framing 19a with electrical insulators (not shown) arranged therebetween. Thus, apart from the high-voltage alternating current potential generator 51c, the electrode plates 51a are completely insulated. The second electrode plates 51b are also fixed to the framing 19a with electrical insulators (not shown) arranged therebetween. Thus, apart from the grounding 51d, they are completely insulated.

The intensity of the electric field is determined by the high-voltage alternating current potential applied to the first electrode plates 51a and the distance between the electrodes 51a and the pans 19b, and it is to be adjusted by changing the high-voltage alternating current potential according to the object-to-be-frozen 3, and it is to be set in the range of 100 to 1000 kV/m. The high-voltage alternating current potential is adjusted so that it fluctuates sinusoidally in view of time.

When the electric field is applied to the objects-to-be-frozen 3, electrons are given to the water molecules contained in the objects-to-be-frozen, and electron-imparted water is produced. The electron-imp ed water produces radicals such as hydroxy-radicals, and the cell membranes of microbes such as bacteria can be destroyed by these hydroxy-radicals. Thus, by applying an electric field during freezing, it is possible to realize a bacteriostatic effect, prevent putrefaction of the objects-to-be-frozen 3, and improve quality. Although the cells on the surface of the object-to-be-frozen 3 are also destroyed by the hydroxy-radicals, this number is negligible, considering the overall number of cells of the object-to-be-frozen.

The electric field is to be in the range of 100 to 1000 kV/m because if it is smaller than 100 kV/m, the number of hydroxy-radicals produced will be too small and the bacteriostatic effect will weaken, and if it is over 1000 kV/m, there is a tendency of electric discharge.

The fluctuating magnetic field generator 21 comprises a static magnetic field generator 21a which applies a static magnetic field in the central portion of the chamber of the freezing store 11; and a dynamic magnetic field generator 21b which applies a fluctuating magnetic field in the central portion of the chamber, wherein the magnetic field fluctuates in both the positive and negative direction about the static magnetic field with an amplitude that amounts to 5% the intensity of the static magnetic field. The static magnetic field generator 21a is a permanent magnet 21a which is made from a ferrite plate having an intensity of 1500 Gs and formed into a rectangular strip of 1.0 m×0.1 m×0.05 m. One of the lengths has a polarity of the N-pole, and the other length has a polarity of the S-pole. A plurality of permanent magnets 21a is arranged at appropriate intervals on the outer surface of a side wall of the freezing-chamber walls 13a with the N-pole side facing upwards. The magnets are arranged on the outer surfaces of the three other side walls so that the polarity is directed in the same direction. Thus, a vertical static magnetic field is applied to the objects-to-be-frozen 3 placed on the rack 19 which is placed in the central portion of the chamber. In the present embodiment, the static magnetic field at the central portion of the chamber is adjusted to be 100 Gs by means of the permanent magnets 21a having an intensity of 1500 Gs. However, the intensity of the static magnetic field can be changed by appropriately selecting the permanent magnets. The above-mentioned effect brought about by a magnetic field can be obtained if the intensity is larger than the terrestrial magnetism (0.3 Gs to 0.5 Gs,) and thus, the magnetic field can be of any intensity if it is 1 Gs or over. Therefore, considering the limits in manufacturing the permanent magnets, it is preferable to set the intensity of the permanent magnets to be in the range of 1 to 20000 Gs.

The dynamic magnetic field generator is an electromagnetic coil 21b which generates a magnetic field when an electric current is supplied, and two of them are provided outside of and lateral to the freezing-chamber walls 13a, with the freezing-chamber located in between. The axis of the electromagnetic coils 21b are arranged in the vertical direction. When an alternating current having a specific frequency runs through the electromagnetic coil 21b, a magnetic field, which has the above frequency and fluctuates back and forth periodically and sinusoidally, is applied in the central portion of the chamber in parallel to the above-mentioned static magnetic field. The static magnetic field and the fluctuating magnetic field, i.e. the dynamic magnetic field, are superimposed onto each other, and a fluctuating magnetic field is applied to the central portion of the chamber.

For example, in the present embodiment, an alternating current taken from a 50 Hz commercial alternating current is flown through the electromagnetic coils 21b to generate a dynamic magnetic field that fluctuates ±5 Gs, which is 5% of the intensity of the static magnetic field. This dynamic magnetic field is superimposed on the static magnetic field having an intensity of 100 Gs, and a fluctuating magnetic field that fluctuates sinusoidally in the range of 95 to 105 Gs with a frequency of 50 Hz is applied to the central portion of the chamber.

The range in which the magnetic field fluctuates is set to be in a range where the amplitude amounts to 5% of the intensity of the static magnetic field, that is, a range of 5% in both the positive and negative directions, taking the intensity of the static magnetic field as a reference value. However, if the range is within 5 to 15% of the fixed value, it would be possible to align the above-mentioned magnetic moment caused by the electron spin substantially in one direction while sufficiently obtaining the advantage of the fluctuation effect.

An explanation of the effect of a magnetic field will be made hereinafter.

When the magnetic field is applied to the object-to-be-frozen 3 during cooling, the magnetic moment, which is caused by the electron spin of the molecules constituting the object-to-be-frozen 3 and of the free water molecules contained therein, is aligned to one direction by the magnetic field. Thus the cold is transmitted to the inner portion of the object-to-be-frozen 3 quickly. That is, the difference in internal and external temperature within the object-to-be-frozen 3 which occurs during cooling,, i.e. the unevenness in cooling, is considerably reduced to realize quick cooling even in the inner portion. Also, since freezing does not start from the outer surface, an outer frozen layer which inhibits heat transmission will not be formed, and thus, efficient transmission of cold to the inner portion of the object can be realized, resulting in a considerable acceleration in cooling velocity of the inner portion. As a result, freezing is carried out evenly and simultaneously throughout the whole object-to-be-frozen 3, and the time period in which freezing initiates and terminates can be reduced to an extremely short time.

When cooling is carried out while applying a magnetic field to the object-to-be-frozen 3, the free water within the object-to-be-frozen 3 will be brought into a supercooled state. A further cooling will initiate freezing to take place, but since a heat quantity equivalent to the latent heat of solidification (forming ice) has already been taken away, the freezing will proceed quickly, and accordingly, the temperature of the object-to-be-frozen 3 will drop quickly.

As a result, the above two effects together contribute to reducing the time period in which freezing of the free water initiates and terminates to an extremely short time, that is, contribute to dropping the temperature quickly enough to pass through the temperature range of 0 to −20° C. in which ice crystals are apt to grow. Therefore, the ice crystals of the free water are restrained from growing too large, and thus, it is possible to prevent destruction of the cellular structure of the object-to-be-frozen 3 during freezing, restrain dripping from occurring upon defrosting, and preserve the freshness at high standards.

In general, water clusters form a hydrogen bond with polar groups which face outwards from the outer surface of the tertiary structure of proteins constructing the object-to-be-frozen 3, and are turned into bound water. However, application of a magnetic field causes the water clusters, which are aggregations of free water molecules, to divide up into smaller groups. Thus, the small clusters attach compactly and evenly to the outer surface of the tertiary structure to form an envelope-like covering. That is, the small clusters attach to the whole outer surface in an even, monomolecular layer-like manner to form an envelope of bound water. Therefore, the envelope of bound water prevents the tertiary structure, i.e. the object-to-be-frozen 3 from being oxidized, and can preserve the freshness at high standards.

Since the bound water is strongly attached to the tertiary structure, its freezing point is depressed to be in the range of −10 to −100° C. Thus, generally, the bound water is not subjected to freezing. By forming small clusters, free water is bound thoroughly to the outer surface of the tertiary structure, and thus, most of the free water is turned into bound water. Therefore, the absolute amount of free water is reduced, and it becomes possible to indirectly restrain free water crystals from growing too large.

Further, by fluctuating the magnetic field, it is possible to reduce the counteraction against the action of the static magnetic field, i.e. reduce the counter effect to the static field, enable the functions imparted by application of the magnetic field to work efficiently, and considerably improve the effects brought about by the magnetic field.

Furthermore, because the magnetic field is fluctuated, the magnetic flux is changed and an electromagnetic induction occurs within the object-to-be-frozen. Thus, the induced electromotive force caused by the electromagnetic induction generates free electrons within the object. The object-to-be-frozen itself is reduced by these free electrons and is prevented from oxidization. As for the water within the object-to-be-frozen, the free electrons are given to the water, and electron-imparted water is produced. The electron-imparted water produces radicals such as hydroxy-radicals, and the cell membranes of microbes such as bacteria can be destroyed by these hydroxy-radicals. Therefore, it is possible to limit the number of live bacteria.

The results of tests comparing freezing features of the above-described super-quick freezing apparatus according to the present embodiment and those of a conventional quick freezer are described below.

In order to examine the difference between the apparatuses, a test was carried out by placing the same object-to-be-frozen into each quick freezing apparatus, employing the same cooling pattern for the chamber temperature, and cooling and freezing the objects-to-be-frozen to a target temperature (−50° C). During the above period, the change in the core temperature of each object-to-be-frozen was estimated. The objects were then stored for 4 months at −50° C., and the quality of each object-to-be-frozen after defrosting was also estimated.

The test conditions are shown in Table 1. The results of the test in cooling rate during the freezing process are shown in FIG. 2, while the results of the test in quality of each object-to-be-frozen after defrosting are shown in Table 2 and Table 3.

TABLE 1

| | | Method and apparatus of present invention | Conventional method and apparatus |
|---|---|---|---|
| Apparatus | Intensity of magnetic field | 100 Gauss | none |
| | Fluctuating magnetic field | ±5 Gauss | none |
| | Wind velocity | cold wind velocity 1 m/sec | same as the left |
| | Sound wave | 20 Hz to 2000 Hz | none |
| | Static electric field | Field intensity 6000 V/cm (high-voltage alternating current potential applied) | none |
| Target temperature | | −50° C. (core temp. of object-to-be-frozen) | −50° C. (core temp. of object-to-be-frozen) |

As can be seen in FIG. 2, the same cooling pattern is employed for the chamber temperatures of freezing stores of both the super-quick freezing apparatus of the present invention and the conventional freezing apparatus. The chamber temperature is set at −40° C. at the beginning of the freezing process, and is dropped at a cooling rate of 1° C./min for the first 20 minutes, and after this 20 minute period, it is kept at −60° C.

It can be appreciated by observing the core temperatures of the objects-to-be-frozen that the cooling curves for both the conventional apparatus and the present invention ranging between 10° C. (at the beginning of freezing) to −20° C. have exactly the same shape, depicting a gentle curve with a gradual drop in temperature. However, after 45 minutes from the beginning of freezing where the temperature reaches −2° C., the core temperature of the object-to-be-frozen placed in the super-quick freezing apparatus of the present invention suddenly drops, and reaches −20° C. at 58 minutes. That is, only a short period of time, i.e. 13 minutes is required to pass the temperature range in which freezing initiates and terminates, i.e., the temperature range of 0 to −20° C. in which ice of free water grows into bulky crystals upon freezing. The core temperature of the object-to-be-frozen reaches the target temperature of −50° C. in the next 15 minutes, that is, at 70 minutes from the beginning of freezing. On the contrary, although not shown in the figure, in the conventional quick freezing apparatus, the target temperature of −50° C. could not be reached even after 180 minutes from the beginning of freezing.

The quality of various perishable foods and the number of live bacteria, after freeze-storing the objects-to-be-frozen for 4 months at −50° C. and defrosting the object, are shown in Table 2. It can be appreciated that, although the objects in the conventional quick freezing apparatus show both dripping and discoloration and also emit offensive odors, the objects stored in the super-quick freezing apparatus of the present invention show no sign of such drawbacks, and the freshness of the objects can be preserved at a high standard which is comparable to that at the beginning of freezing. Further, in the conventional apparatus, the number of live bacteria is not decreased; but in the apparatus of the present invention, the number is remarkably reduced, and in particular, *E.Coli* is exterminated.

TABLE 2

| | | | Method and apparatus of present invention | Conventional method and apparatus |
|---|---|---|---|---|
| Qual-ity* | Tuna | | No dripping, no change in color, no offensive odor | Causes dripping, change in color, and offensive odor |
| | Sardine | | No dripping, no change in color, no offensive odor | Causes dripping, change in color, and offensive odor |
| | Pork | | No dripping, no change in color, no offensive odor | Causes dripping, change in color, and offensive odor |
| Num-ber of bac-teria | E. coli | before freezing | $10^3$ | $10^3$ |
| | | after freezing* | 0 | $10^3$ |
| | Gere-ral bac-teria | before freezing | $10^3$ | $10^3$ |
| | | after freezing* | $10^1$ | $10^3$ |

*after freezing for 4 months at −50° C.

It is understood from the above that, according to the present invention, it is possible to keep the objects-to-be-frozen in a good, fresh condition by preventing cells of the objects from being destroyed, restraining oxidization, and exterminating live bacteria and preventing putrefaction. It has been confirmed that the above advantages can also be obtained when employing conditions not shown in Table 1, insofar as they are within the scope of the present invention.

For reference, the same test was carried out in the save manner for other food ingredients such as juices, the results of which being shown in Table 3. An excellent result was obtained; juices and wines did not separate into water and juice component after freezing and defrosting, and oranges and cakes did not show change in look, shape or taste. As for the juices and wines, this is because an envelope of bound water is formed thoroughly around the outer surface of the tertiary structures of the components of the juices and wines, enabling easy hydration of the tertiary structures with the surrounding water. As for oranges and cakes, the above results are obtained because the envelope of bound water formed around the outer surface of the tertiary structures prevents oxidization, and the bound water turns into free water after defrosting and disperses in the same condition as it used to before freezing, i.e. disperses evenly within the oranges and cakes.

TABLE 3

| | | Method and apparatus of present invention | Conventional method and apparatus |
|---|---|---|---|
| Qual-ity* | Juices | Not separated into water and juice component | Occurrence of separation |
| | Wines | Not separated into water and wine component | Occurrence of separation |
| | Oranges | No change in color and smell, no discoloration | Deterioration in color and smell, slightly discolored |
| | Cakes | No change in shape and taste | Change in shape and taste |

*after freezing for 4 months at −50° C.

The above is an explanation of an embodiment of the present invention, and thus, the present invention is not to be limited to the above embodiment, and various modifications can be made as long as they do not depart from the scope of the claims.

(a) In the above embodiment, although the boundary-layer of air was stirred up by superimposing sound waves to the cold wind ventilated by the ventilators 31, a pulsating variation in air pressure can be caused by the vibrations of the fins 31a of the ventilators 31, which variation having similar advantages as those brought about by sound waves. Thus, instead of damping the vibrations of the fins 31a, it is possible to use them advantageously.

(b) Although an electric field was applied in the vertical direction by arranging pairs of electrode plates 51a, 51b opposingly and vertically to each other in the above embodiment, it is not to be limited to this configuration as long as an electric field with an intensity of 100 to 1000 kV/m is applied to the object-to-be-frozen. It is possible to opposingly arrange a pair of electrode plates in the lateral direction and apply an electric field to the object-to-be-frozen 3 in the horizontal direction.

Further, in the above embodiment, a high-voltage alternating current potential generator was used as a potential generating apparatus for applying a high-voltage alternating current potential that periodically fluctuates in a sinusoidal manner against time. However, it is not limited to this configuration, and the electric potential could be periodically changed in a stepwise manner; or, a static potential, i.e., an electric potential that does not change periodically could be caused by using a high-voltage direct current potential generator, and a constant electric field can be applied.

(c) Although the magnetic field is applied in the vertical direction in the above embodiment, it does not have to be limited to this configuration if a unidirectional magnetic field is applied to the object-to-be-frozen 3, and thus a horizontal magnetic field can be applied. For example, by arranging the permanent magnets 21a on the outer surfaces of the ceiling and bottom wall of the freezing chamber walls 13a, and by arranging the electromagnetic coils outside the permanent magnets so the axis of the coils are aligned in the horizontal direction, it is possible to generate a magnetic field in the horizontal direction.

Further, in the above embodiment, a fluctuating magnetic field, that fluctuates ±5% in both the positive and negative directions about a reference value (which is an arbitrary fixed value), is realized by superimposing a dynamic magnetic field that is generated by the electromagnetic coils and that has an intensity within 5% of the static magnetic field onto the static magnetic field which is generated by the permanent magnets. However, it is not to be limited to this method. For example, the permanent magnets do not have to be used, and the above can be accomplished by running a direct current, that generates the magnetic field with the above reference value, through the electromagnetic coils, and also running and superimposing an alternating current with an intensity of ±5% of the direct current.

Furthermore, although a dynamic magnetic field that fluctuates periodically in a sinusoidal manner against time was used as the fluctuating magnetic field in the above embodiment, it does not have to be limited to this method, and a dynamic magnetic field that changes periodically in a stepwise manner can be employed instead.

(d) In the above embodiment, a compressor 17a, a condenser 17b, a capillary tube 17c, and evaporators 17d, all of which are generally used, were employed to construct the refrigeration cycle of the freezer 17. However, it does not have to be limited to this configuration as long as the ambient temperature around the object-to-be-frozen (the chamber temperature) can be dropped to −30 to −100° C.

(e) In the above embodiment, cooling was realized by ventilating the cold air in the chamber towards and around the object-to-be-frozen, i.e., a gaseous body was used as a coolant for cooling the object-to-be-frozen. However, as long as the temperature around the object-to-be-frozen can be dropped to −30 to −100° C., and if the above-described pre-freezing process and the post-treatment process can be performed, it is possible to use alcohols such as methanol and ethanol or ethylene glycol as a coolant. Specifically, this can be implemented by placing a container filled with a liquid coolant in the central portion of the chamber, and freezing the object-to-be-frozen by immersing it into the liquid coolant while applying a magnetic field, and also an electric field if necessary, to the central portion of the chamber.

As can be seen from the above description, according to the present invention, quick freezing is carried out by dropping the surrounding temperature of the object-to-be-frozen to −30 to −100° C. while applying a unidirectional magnetic field to the object. Thus, it is possible to prevent the cells of the object-to-be-frozen from being destructed during the freezing process, and prevent oxidization by means of the envelope of bound water formed on the outer surface of the tertiary structures that compose the object-to-be-frozen. Therefore, it is possible to realize the same freshness even after defrosting.

Further, since the surrounding temperature is set in the range of −30 to −100° C., it is possible to keep the running cost during the refrigeration cycle from increasing while efficiently preventing oxidization of the surface of the objects-to-be-frozen. Also it is possible to keep the running cost low even during freezing-storage.

In this way, it is possible to preserve the freshness of an object-to-be-frozen at a high standard, and supply high-quality food ingredients and products to consumers at low cost. Also, it is possible to freeze organs used for transplants, such as biomedical transplants, without impairing its functions, and thus, save lives of many people.

By making the unidirectional magnetic field fluctuate, it is possible to reduce the counteraction against the action of the static magnetic field, i.e. reduce the counter effect to the static field, and enable the effects caused by application of the magnetic field to work more efficiently. Since free electrons are generated within the object-to-be-frozen, oxidation of the object can be prevented, and radicals such as hydroxy-radicals are produced within the object-to-be-frozen. Since these hydroxy-radicals destroy the cell membranes of the microbes such as bacteria, it is possible to restrain the number of live bacteria. Therefore, it is possible to prevent putrefaction of the object-to-be-frozen, improve the freshness thereof, and supply high-quality food ingredients and food products to consumers.

Further, since the sound waves further accelerate the cooling rate of the object-to-be-frozen, quick freezing can be realized and cell destruction can certainly be prevented. By using sound waves in the audio-frequency range, and setting the wind velocity of the cold air within 1 to 5 m/sec, it is possible to prevent oxidization of the object-to-be-frozen without breaking the water envelope formed on its surface, while enhancing cooling speed.

Furthermore, by applying the electric field to the object-to-be-frozen, water within the object is turned into electron-imparted water producing radicals such as hydroxy-radicals, and the cell membranes of microbes such as bacteria are destroyed by these hydroxy-radicals to thus restrain the number of live bacteria. Therefore, it is possible to prevent putrefaction of the objects-to-be-frozen and improve its freshness, and also supply high-quality food ingredients and food products to consumers.

Furthermore, by separately constructing the static magnetic field generator and the dynamic magnetic field generator, the type of magnetic field generating means can be selected more freely. Therefore, in considering cost-effectiveness, it would be possible to use a less-expensive means to reduce the overall cost of the freezing apparatus.

By arranging far-infrared-ray absorbing material on the inner surface of the freezing chamber walls and by supplying heat insulators around the outer periphery of the freezing chamber walls, it is possible to maintain the chamber temperature efficiently and realize reduction in power consumption required for cooling.

By using permanent magnets as the static magnetic field generating means, it is possible to reduce the capacity of the electromagnetic coils that realize the fluctuating magnetic field, lower the cost of the freezing apparatus, and also reduce power consumption. Also, by providing the electromagnetic coils outside the freezing chamber walls, the cooling ability within the chamber can be prevented from depressing, which would otherwise be caused by the heating of the electromagnetic coils, and thus, power consumption required for cooling can be reduced.

What is claimed is:

1. A super-quick freezing method, comprising:
    cooling the surrounding temperature of an object-to-be-frozen to −30° C. to −100° C. while applying a unidirectional magnetic field to said object-to-be-frozen; and
    cooling said object-to-be-frozen with a cold wind having a velocity of 1 m/sec to 5 m/sec while superimposing a sound wave within the audio-frequency range onto said cold wind.

2. A super-quick freezing method according to claim 1, wherein the intensity of said unidirectional magnetic field fluctuates about an arbitrary fixed-value reference in both the positive and negative directions within a predetermined range.

3. A super-quick freezing method according to claim 1, further comprising:
applying an electric field to said object-to-be-frozen.

4. A super-quick freezing method, comprising:
cooling the surrounding temperature of an object-to-be-frozen to −30° C. to −100° C. while applying a unidirectional magnetic field to said object-to-be-frozen;
cooling said object-to-be-frozen with a cold wind having a velocity of 1 m/sec to 5 m/sec while superimposing a sound wave within the audio-frequency range onto said cold wind; and
applying an electric field to said object-to-be-frozen;
wherein the intensity of said unidirectional magnetic field fluctuates about an arbitrary fixed-value reference in both the positive and negative directions within a predetermined range.

5. A super-quick freezing apparatus, comprising:
a freezing store capable of lowering the inner-temperature around a stored object-to-be-frozen to −30° C. to −100° C.; and
a magnetic field generating means for applying a unidirectional magnetic field to said object-to-be-frozen placed in said freezing store, having a static magnetic field generating means for applying a static magnetic field with an intensity of said arbitrary fixed value and a dynamic magnetic field generating means for applying the fluctuating magnetic field that fluctuates within said predetermined range,
whereby the intensity of said unidirectional magnetic field fluctuates about an arbitrary fixed-value reference in both the positive and negative directions within a predetermined range.

6. A super-quick freezing apparatus according to claim 5 further comprising:
an electric field generating means for applying an electric field to said object-to-be-frozen.

7. A super-quick freezing apparatus according to claim 6, wherein said electric field generating means comprises:
at least one pair of electrodes that are arranged so as to oppose to each other across said object-to-be-frozen placed within said freezing store; and
a potential generating means for applying an electric potential between said electrodes.

8. A super-quick freezing apparatus, comprising:
a freezing store capable of lowering the inner-temperature around a stored object-to-be-frozen to −30° C. to −100° C.;
a magnetic field generating means for applying a unidirectional magnetic field to said object-to-be-frozen placed in said freezing store;
a ventilating means for ventilating cold air within said freezing store towards the object-to-be-frozen at a wind velocity of 1 m/sec to 5 m/sec; and
a sound wave generating means for superimposing a sound wave within the audio-frequency range onto said cold wind ventilated by said ventilating means.

9. A super-quick freezing apparatus according to claim 8 further comprising:
an electric field generating means for applying an electric field to said object-to-be-frozen.

10. A super-quick freezing apparatus according to claim 9, wherein said electric field generating means comprises:

at least one pair of electrodes that are arranged so as to oppose to each other across said object-to-be-frozen placed within said freezing store; and
a potential generating means for applying an electric potential between said electrodes.

11. A super-quick freezing apparatus, comprising:
a freezing store including freezing chamber walls which define a chamber space, a far-infrared-ray absorbing means arranged on the inner wall surface of said freezing chamber walls, and a heat insulating means provided around said freezing chamber walls, said freezing store being capable of lowering the inner-temperature around a stored object-to-be-frozen to −30° C. to 100° C.; and
a magnetic field generating means for applying a unidirectional magnetic field to said object-to-be-frozen placed in said freezing store, in which the intensity of said unidirectional magnetic field fluctuates about an arbitrary fixed-value reference in both the positive and negative directions within a predetermined range;
said magnetic field generating means comprising a static magnetic field generating means for applying a static magnetic field with an intensity of said arbitrary fixed value; and a dynamic magnetic field generating means for applying the unidirectional magnetic field that fluctuates within said predetermined range; wherein
said static magnetic field generating means is a permanent magnet which generates the static magnetic field within the chamber, and is provided on the outer wall surface of said freezing chamber walls; and
said dynamic magnetic field generating means is an electromagnetic coil which generates the fluctuating magnetic field fluctuating back and forth about said static magnetic field, and is provided outside of and lateral to said freezing chamber walls.

12. A super-quick freezing apparatus, comprising:
a freezing store capable of lowering the inner-temperature around a stored object-to-be-frozen to −30° C. to −100° C.;
a magnetic field generating means for applying a unidirectional magnetic field to said object-to-be-frozen within said freezing store, the intensity of said unidirectional magnetic field being fluctuated about an arbitrary fixed-value reference in both the positive and negative directions within a predetermined range;
a ventilating means for ventilating cold air within said freezing store towards an object-to-be-frozen at a wind velocity of 1 m/sec to 5 m/sec;
a sound wave generating means for superimposing a sound wave within the audio-frequency range onto said cold wind ventilated by said ventilating means; and
an electric field generating means for applying an electric field to said object-to-be-frozen.

13. A super-quick freezing apparatus, comprising:
a freezing store comprising freezing chamber walls which define a chamber space, a far-infrared-ray absorbing means arranged on the inner wall surface of said freezing chamber walls, and a heat insulating means provided around said freezing chamber walls, said freezing store capable of lowering the inner-temperature around a stored object-to-be-frozen to −30° C. to −100° C.;
a magnetic field generating means comprising at least one permanent magnet provided on the outer wall surface of said freezing chamber walls to generate a static magnetic field within said chamber space, and at least one electromagnetic coil provided outside of and lateral to said freezing chamber walls to generate a fluctuating magnetic field that fluctuates back and forth about said static magnetic field within said chamber space, said fluctuating magnetic field generating means applying a unidirectional magnetic field, which is fluctuated about an arbitrary fixed-value reference in both the positive and negative directions within a predetermined range, to said object-to-be-frozen within said freezing store;

a ventilating means for ventilating cold air within said freezing store towards an object-to-be-frozen at a wind velocity of 1 m/sec to 5 m/sec;

a sound wave generating means for superimposing a sound wave within the audio-frequency range onto said cold wind ventilated by said ventilating means; and an electric field generating means comprising at least one pair of electrodes that are arranged so as to oppose to each other across said object-to-be-frozen placed within said freezing store, and a potential generating means for applying an electric potential between said electrodes, said electric field generating means applying an electric field to said object-to-be-frozen.

* * * * *